United States Patent

[11] 3,630,543

| [72] | Inventors | David J. Cripps<br>Farmington;<br>Joseph F. Koral, Sterling Heights, both of Mich. |
|---|---|---|
| [21] | Appl. No. | 56,525 |
| [22] | Filed | July 20, 1970 |
| [45] | Patented | Dec. 28, 1971 |
| [73] | Assignee | General Motors Corporation<br>Detroit, Mich. |

[54] RESTRAINT BELT LINEAR STOWAGE ASSEMBLY
3 Claims, 8 Drawing Figs.

[52] U.S. Cl. ................................................ 280/150 SB, 297/388
[51] Int. Cl. .............................................. B60r 21/10
[50] Field of Search ........................................ 280/150 SB; 297/388, 389

[56] References Cited
UNITED STATES PATENTS

| 3,532,361 | 10/1970 | Hrynik | 280/150 SB |
| 3,545,788 | 12/1970 | Brawner | 280/150 SB |
| 3,551,002 | 12/1970 | Dozois | 280/150 SB |

*Primary Examiner*—Benjamin Hersh
*Assistant Examiner*—Robert R. Song
*Attorneys*—W. E. Finken and Herbert Furman ABSTRACT: A restraint belt linear stowage assembly includes an elongated housing mounted on a vehicle. The housing has elongated channel portions that receive respective lateral flange portions of a carrier to mount the carrier for movement longitudinally of the housing between retracted and extended positions. A forklike spring clip includes a base portion riveted to the carrier. A cable of a spring reel, mounted on the housing, is hooked to the base portion to bias the carrier toward retracted position. A central latch portion of the clip is normally engageable with the housing in extended position to hold the carrier in extended position against the bias of the spring reel. The clip also includes attachment portions, one on each side of the latch portion, that allow selective attaching and detaching of a restraint belt D-ring and the carrier in extended position. With the D-ring attached to the carrier, longitudinal movement of the D-ring toward the spring reel causes the D-ring to move with respect to the carrier and to engage the latch portion. This engagement moves the latch portion out of engagement with the housing and allows the spring reel to move the carrier to retracted position and thus stow a portion of the belt along the longitudinal length of the housing.

PATENTED DEC 28 1971 3,630,543

INVENTORS
David J. Cripps &
BY Joseph F. Koral
Herbert Furman
ATTORNEY

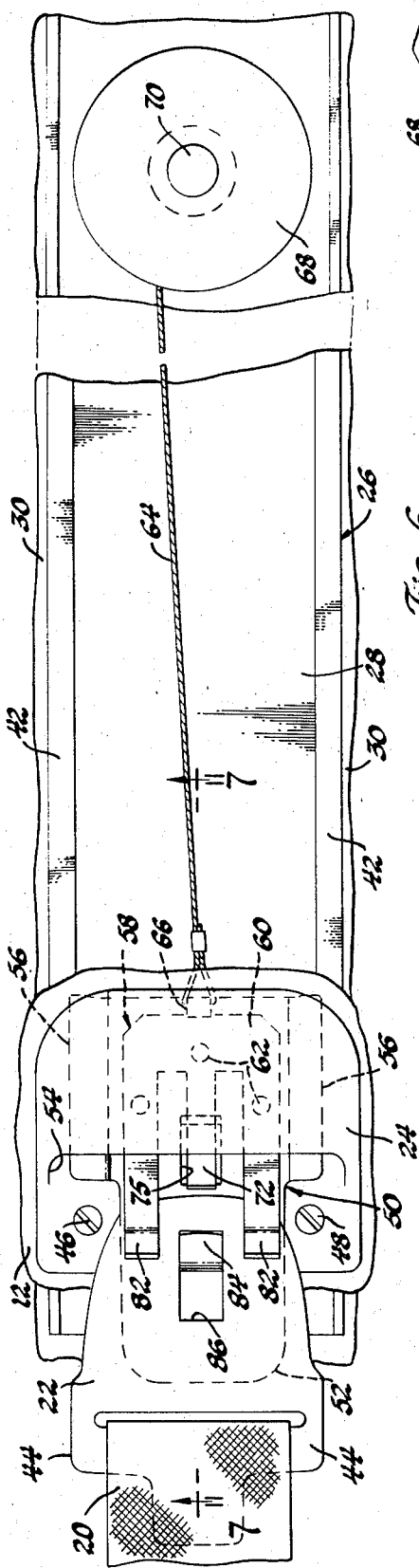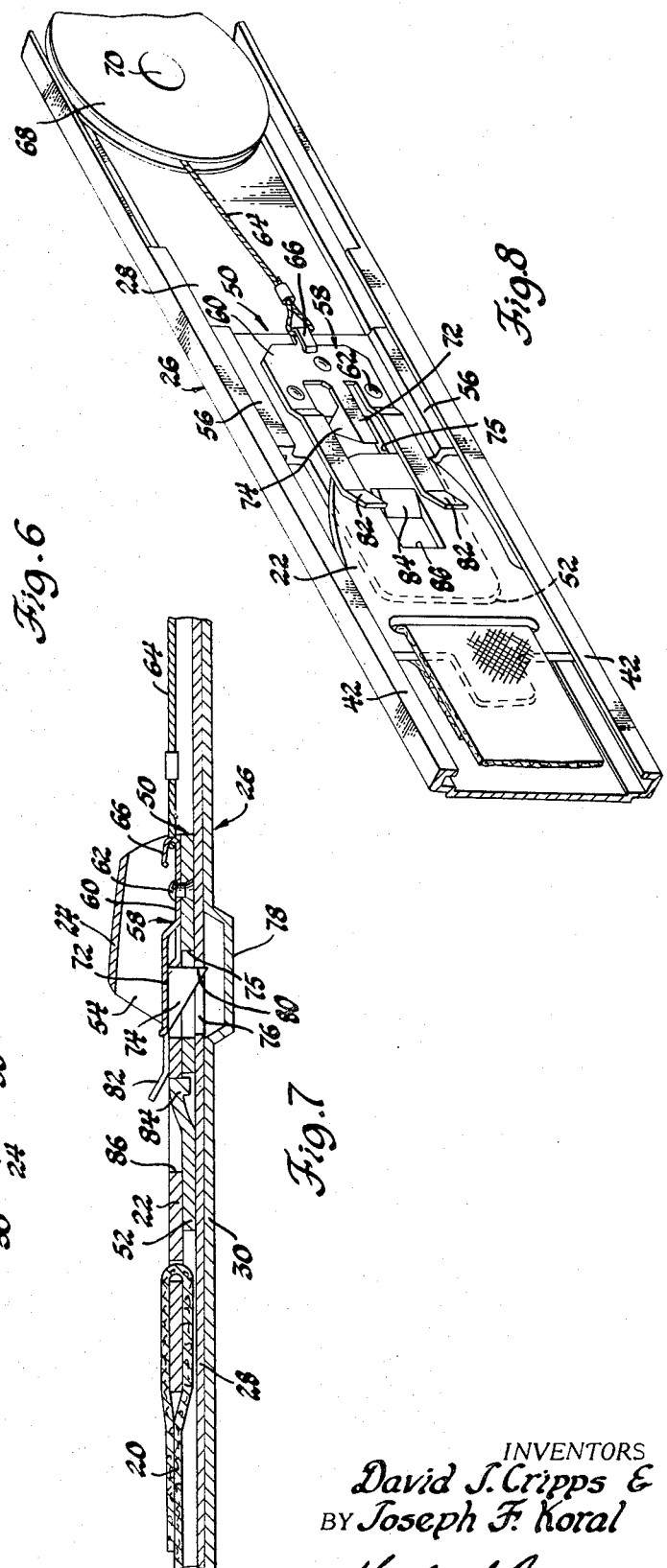

RESTRAINT BELT LINEAR STOWAGE ASSEMBLY

This invention relates to restraint belt linear stowage assemblies and more particularly to a restraint belt linear stowage assembly in which the free end of a restraint belt is attachable to a carrier that moves to a retracted position to stow the belt.

Restraint belt linear stowage assemblies conventionally include elongated housings that slidably mount carriers for longitudinal movement with respect thereto between retracted and extended positions. In one type of these storage assemblies, one end of the restraint belt is secured to the carrier. With the carrier in extended position, the free end of the belt extends outwardly of the housing for occupant use. Movement of the carrier to retracted position moves the belt to within the housing to be stowed along the longitudinal length thereof. In another type of these stowage assemblies, a restraint belt has one end secured to the housing adjacent the position at which the free end of the belt extends outwardly of the housing with the carrier in extended position. The belt is looped around the carrier such that movement of the carrier to retracted position stows the belt within the housing in a generally U-shaped configuration.

This invention provides a linear stowage assembly in which the free end of a restraint belt is attachable to the carrier which moves to retracted position to stow a portion of the belt along the longitudinal length of the housing.

An object of this invention is to provide a restraint belt linear stowage assembly in which the free end of a restraint belt is attachable to a carrier that is mounted by an elongated housing and held in an extended position by a latch means unlatching of which allows a retracting means to move the carrier longitudinally of the housing to a retracted position to stow the belt along the longitudinal length of the housing.

In carrying out this object, the stowage assembly of this invention includes a body-mounted elongated housing that slidably mounts a carrier that is biased from an extended position toward a retracted position by a housing mounted spring reel. A generally forklike spring clip includes a central latch portion that normally engages the housing in extended position to hold the carrier in extended position against the bias of the spring reel. Attachment portions of the clip, one on each side of the latch portion, allow selective attaching and detaching of a restraint belt D-ring and the carrier in extended position. The D-ring, attached to the carrier, is slidably movable with respect to the carrier toward the spring reel to engage the latch portion and move the latch portion out of engagement with the housing. The spring reel is then free to move the carrier to retracted position and thus stow the belt along the longitudinal length of the housing. When use of the belt is required, a force applied to the stowed belt overcomes the bias of the spring reel and moves the carrier to extended position in which it is held by the latch portion and in which the D-ring can be detached therefrom to allow use of the belt.

In the drawings:

FIG. 6 is similar to FIG. 3 but with the carrier in extended position;

FIG. 7 is a sectional view taken generally along line 7—7 of FIG. 6; and

FIG. 8 is a perspective view of a portion of the stowage assembly with the carrier in retracted position.

Figure 1:
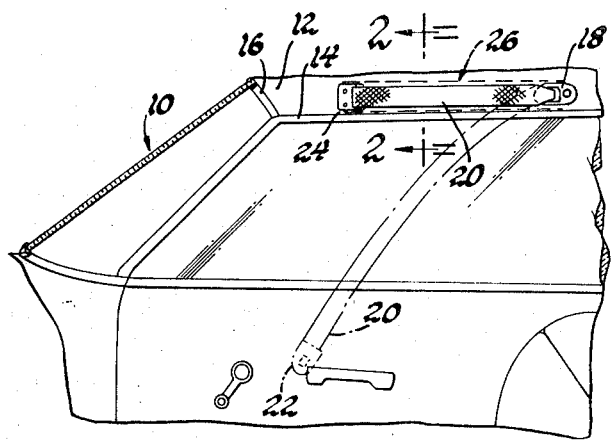
FIG. 1 is a cutaway view of a portion of a vehicle which includes a dashed line indicated linear stowage assembly according to the invention for stowage of a restraint belt shown in a solid line stowed position and a phantom line use position.

Referring to FIG. 1, a vehicle generally indicated at 10 includes a headlining 12 having its side and forward edges concealed by moldings 14 and 16. A mounting plate 18 is conventionally secured to the vehicle body roof rail and attaches one end of a shoulder restraint belt 20 to the roof rail. As seen in the phantom line indicated use position, a D-ring 22 is secured to the free end of the belt 20. D-ring 22 is adapted to be connected to a buckle of a second restraint belt, not shown, to strap an occupant in seated position. D-ring 22 moves through an opening in an escutcheon 24 of a roof rail mounted dashed line indicated linear stowage assembly 26 to stow the belt 20 in the solid line indicated stowed position in a manner to be hereinafter described. It should be noted that although the linear stowage assembly 26 is herein mounted on the roof rail for use with a shoulder belt, it is also possible to mount the stowage assembly at other locations for use with a lap belt.

Figure 2:
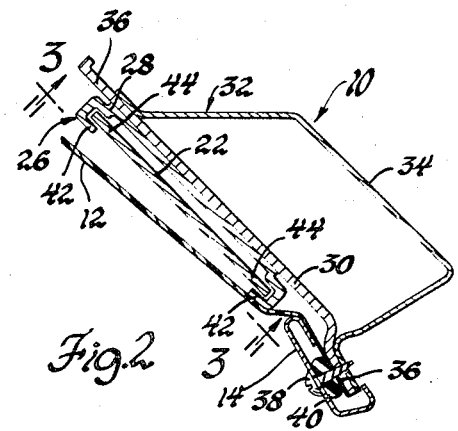
FIG. 2 is an enlarged sectional view of the stowage assembly and a portion of the vehicle body taken generally along line 2—2 of FIG. 1.

Referring to FIG. 2, the stowage assembly 26 includes an elongated housing 28 which is conventionally secured to roof rail inner 30 of roof rail 32. Roof rail outer 34 and roof rail inner 30 are welded to each other at their upper and lower edges to jointly provide upper and lower roof rail flanges 36. Longitudinally spaced pairs of screws 38 and spacers 40 mount molding 14 on the lower flange 36. The headlining 12 extends inboard from molding 14 and conceals housing 28 from the vehicle occupant's view. Housing 28 includes elongated channel portions 42 that receive respective lateral flange portions 44 of D-ring 22 in stowed position and during movement thereto as will be hereinafter described.

Referring to FIG. 6, the escutcheon 24 is secured to housing 28 by screws 46 and 48. A carrier 50 includes a tongue 52 that extends outwardly of stowage assembly 26 through opening 54 in escutcheon 24 when the carrier 50 is in extended position, as in FIG. 6. The channel portions 42 of housing 28 receive respective lateral flange portions 56 of carrier 50 to slidably mount carrier 50 for movement longitudinally of housing 28 between extended position, as in FIG. 6, and retracted position, as in FIGS. 3 and 8.

Figure 3:
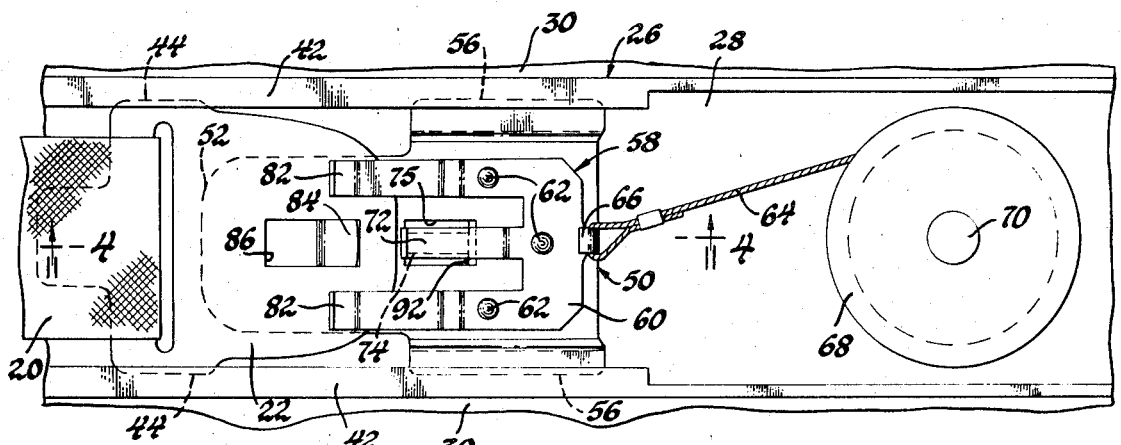
FIG. 3 is a slightly enlarged view taken generally along line 3—3 of FIG. 2 showing a portion of the stowage assembly with the carrier in retracted position.

As best seen in FIGS. 3 and 8, a generally forklike spring clip 58 includes a base portion 60 secured to carrier 50 by rivets 62. A cable 64 has one end looped to a hook 66 of base portion 60 and the other end wound around a conventional spring reel 68. Spring reel 68 is pivotally supported on housing 28 by a pin 70 and biases the carrier 50 toward retracted position. The clip 58 also includes a central latch leg 72 that has spaced triangular latch flanges 74. As best seen in FIG. 7, with carrier 50 in extended position the latch flanges 74 extend through an aperture 75 in carrier 50 and are received within an aperture 76 in housing 28 and a stamped depression 78 in roof rail inner 30. Spring reel 68 biases the latch flanges 74 into engagement with an edge portion 80 of housing 28 that partially defines aperture 76. This engagement holds carrier 50 in extended position against the bias of spring reel 68. Clip 58 additionally includes attachment legs 82 that extend from base portion 60 on opposite sides of latch leg 72 and normally engage tongue 52 on either side of an offset-stamped abutment 84 thereof.

Figure 5:
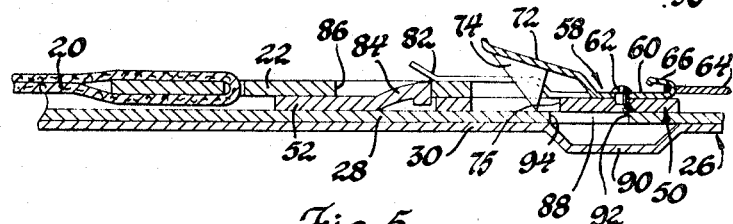
FIG. 5 is similar to FIG. 4 but with the carrier moved slightly toward extended position.

The stowage of belt 20 is accomplished as follows: With the carrier 50 in FIGS. 6 and 7 extended position, the D-ring 22 is inserted between the attachment legs 82 and the tongue 52 of carrier 50 and is moved toward the spring reel 68 until a generally rectangular aperture 86 of D-ring 22 receives abutment 84 of tongue 52. The attachment legs 82 then bias D-ring 22 into planar contact with tongue 52 as shown in FIG. 7 and thus attach D-ring 22 to the carrier 50. At this point, the belt 20 will hang in a loop between the mounting plate 18 and the carrier 50. The rectangular aperture 86 in D-ring 22 is sufficient long such that D-ring 22 can be slid with respect to carrier 50 toward the spring reel 68 and into engagement with the latch flanges 74. This engagement cams the latch flanges upwardly, as in FIG. 7, against the bias of the latch leg 72 and moves the latch flanges 74 out of engagement with edge portion 80 of housing 28. The spring reel 68 then moves the carrier 50 toward retracted position. As the D-ring 22 moves through the opening 54 in escutcheon 24, the elongated channel portions 42 of housing 28 receive the respective lateral flange portions 44 of D-ring 22. During movement toward retracted position, the lateral flange portions 44 of D-ring 22 and the lateral flange portions 56 of carrier 50 slide within the respective elongated channel portions 42 and the latch flanges 74 slide along housing 28 as in FIG. 5. As the carrier 50 moves to retracted position, the loop of belt 20 between mounting plate 18 and escutcheon 24 is shortened until ultimately belt 20 assumes the FIG. 1 stowed position adjacent headliner 12. Just prior to carrier 50 reaching the FIG. 3 retracted position, the latch flanges 74 are received within an aperture 88 of housing 28 and a stamped depression 90 of roof rail inner 30. In retracted position, spring reel 68 biases the latch flanges 74 into engagement with an edge portion 92 of housing 28 that partially defines aperture 88. This engagement prevents the carrier 50 from moving further toward the spring reel 68 than the retracted position. It should be noted that although this embodiment uses the latch flanges 74 to prevent further retracting movement, it is also possible to use stop abutments on housing 28 which are directly engageable with the carrier 50.

Figure 4:
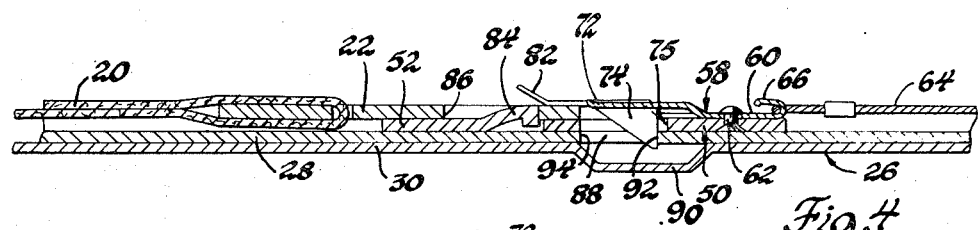
FIG. 4 is a sectional view taken generally along line 4—4 of FIG. 3.

With the carrier 50 in retracted position and the belt 20 in the FIG. 1 stowed position, the occupant removes the belt 20 from stowed position by first grasping belt 20 adjacent escutcheon 24. A force applied to the belt 20 outwardly of escutcheon 24 initially causes the carrier 50 and the D-ring 22 to move from the FIG. 4 position to the FIG. 5 position in which the latch flanges 74 have been cammed out of aperture 88 by an edge portion 94 of housing 28 that partially defines aperture 88. The D-ring 22 and the carrier 50 then move to extended position with the force applied by the occupant overcoming the bias of spring reel 68. When the carrier 50 reaches the FIG. 6 extended position, the latch leg 72 biases the latch flanges 74 into engagement with edge portion 80 to hold the carrier 50 and D-ring 22 in extended position against the bias of spring reel 68. The D-ring 22 is detached from carrier 50 by first applying an upward force, as in FIG. 7, to the slotted end of D-ring 22. This causes D-ring 22 to pivot clockwise, as in FIG. 7, about its apertured end against the bias of the attachment legs 82. When D-ring 22 pivots sufficiently far such that the stamped abutment 84 moves out of rectangular aperture 86, the D-ring 22 is detached from carrier 50 and belt 20 is available to strap an occupant in seated position.

The invention thus provides a linear stowage assembly in which the free end of a restraint belt is attachable to the carrier which moves to retracted position to stow a portion of the belt along the longitudinal length of the assembly housing.

What is claimed is:

1. In combination with a vehicle, a restraint belt linear stowage assembly comprising, a restraint belt having one end fixed with respect to the vehicle, an elongated housing mounted on the vehicle, a carrier mounted by the housing for longitudinal movement with respect thereto between retracted and extended positions, retracting means biasing the carrier toward retracted position, latch means for holding the carrier in extended position against the bias of the retracting means, and attachment means for selectively attaching and detaching the free end of the belt and the carrier in extended position, unlatching of the latch means with the belt attached to the carrier allowing the retracting means to move the carrier to retracted position to stow a portion of the belt along the longitudinal length of the housing.

2. In combination with a vehicle, a restraint belt linear stowage assembly comprising, a restraint belt having one end fixed with respect to the vehicle, a D-ring secured to the free end of the belt, an elongated housing mounted on the vehicle, a carrier mounted by the housing for longitudinal movement with respect thereto between retracted and extended positions, retracting means biasing the carrier toward retracted position, latch means mounted on the carrier and normally engaging the housing in extended position to hold the carrier in extended position against the bias of the retracting means, and attachment means on the carrier for selectively attaching and detaching the D-ring and the carrier in extended position, the D-ring attached to the carrier being movable with respect to the carrier to engage the latch means and move the same out of engagement with the housing allowing the retracting means to move the carrier to retracted position to stow a portion of the belt along the longitudinal length of the housing.

3. In combination with a vehicle, a restraint belt linear stowage assembly comprising, a restraint belt having one end fixed with respect to the vehicle, a D-ring secured to the free end of the belt, an elongated housing mounted on the vehicle, a carrier mounted by the housing for longitudinal movement with respect thereto between retracted and extended positions, retracting means biasing the carrier toward retracted position, an integral clip including a base portion, a latch portion, and an attachment portion, the base portion being mounted on the carrier and normally biasing the latch portion into engagement with the housing in extended position to hold the carrier in extended position against the bias of the retracting means, the attachment portion allowing selective attaching and detaching of the D-ring and the carrier in extended position, the D-ring attached to the carrier being movable with respect to the carrier to engage the latch portion and move the same out of engagement with the housing allowing the retracting means to move the carrier to retracted position to stow a portion of the belt along the longitudinal length of the housing.

* * * * *